(12) United States Patent
Cardenas

(10) Patent No.: US 11,780,280 B1
(45) Date of Patent: Oct. 10, 2023

(54) ELECTRICAL CONNECTION FOR TRAILER HITCH

(71) Applicant: Daniel Cardenas, Marietta, GA (US)

(72) Inventor: Daniel Cardenas, Marietta, GA (US)

(*) Notice: Subject to any disclaimer, the term of this patent is extended or adjusted under 35 U.S.C. 154(b) by 0 days.

(21) Appl. No.: 17/992,070

(22) Filed: Nov. 22, 2022

(51) Int. Cl.
B60D 1/64 (2006.01)
B60D 1/06 (2006.01)
B60D 1/24 (2006.01)

(52) U.S. Cl.
CPC ............ B60D 1/64 (2013.01); B60D 1/06 (2013.01); B60D 1/24 (2013.01)

(58) Field of Classification Search
CPC ............ B60D 1/64; B60D 1/06; B60D 1/24
See application file for complete search history.

(56) References Cited

U.S. PATENT DOCUMENTS

| 3,328,741 A * | 6/1967 | Brown | B60D 1/62 439/708 |
| 8,308,181 B2 * | 11/2012 | Riibe | B60D 1/64 280/422 |
| 10,059,160 B2 * | 8/2018 | Ruiz | B60D 1/065 |
| 10,106,003 B2 | 10/2018 | Cardenas | |
| 11,639,210 B2 * | 5/2023 | Harrill | B62H 3/12 224/282 |

* cited by examiner

Primary Examiner — Tony H Winner
Assistant Examiner — Marlon A Arce
(74) Attorney, Agent, or Firm — H. Jay Spiegel

(57) ABSTRACT

A passageway is formed through a trailer hitch bar allowing an electrical conductor to be threaded through the hitch bar. At a proximal end of the hitch bar the wires are attached to the first half of an electrical conductor. Within a receptacle, a second half of the connector is located to interconnect with the connections on the first half. Conductors are connected to the connector halves and are coupled to electrical contacts on a draw bar on a towing vehicle which connect to an electrical coupling on the vehicle. The wires within the electrical conductor are now connected to the electrical connections already existing in the vehicle allowing the towed vehicle to respond to activations of brakes, turn signals, hazard warnings, headlights, and also engaging the transmission in reverse to activate a solenoid to release trailer brakes to allow a trailer to be moved in reverse.

20 Claims, 7 Drawing Sheets

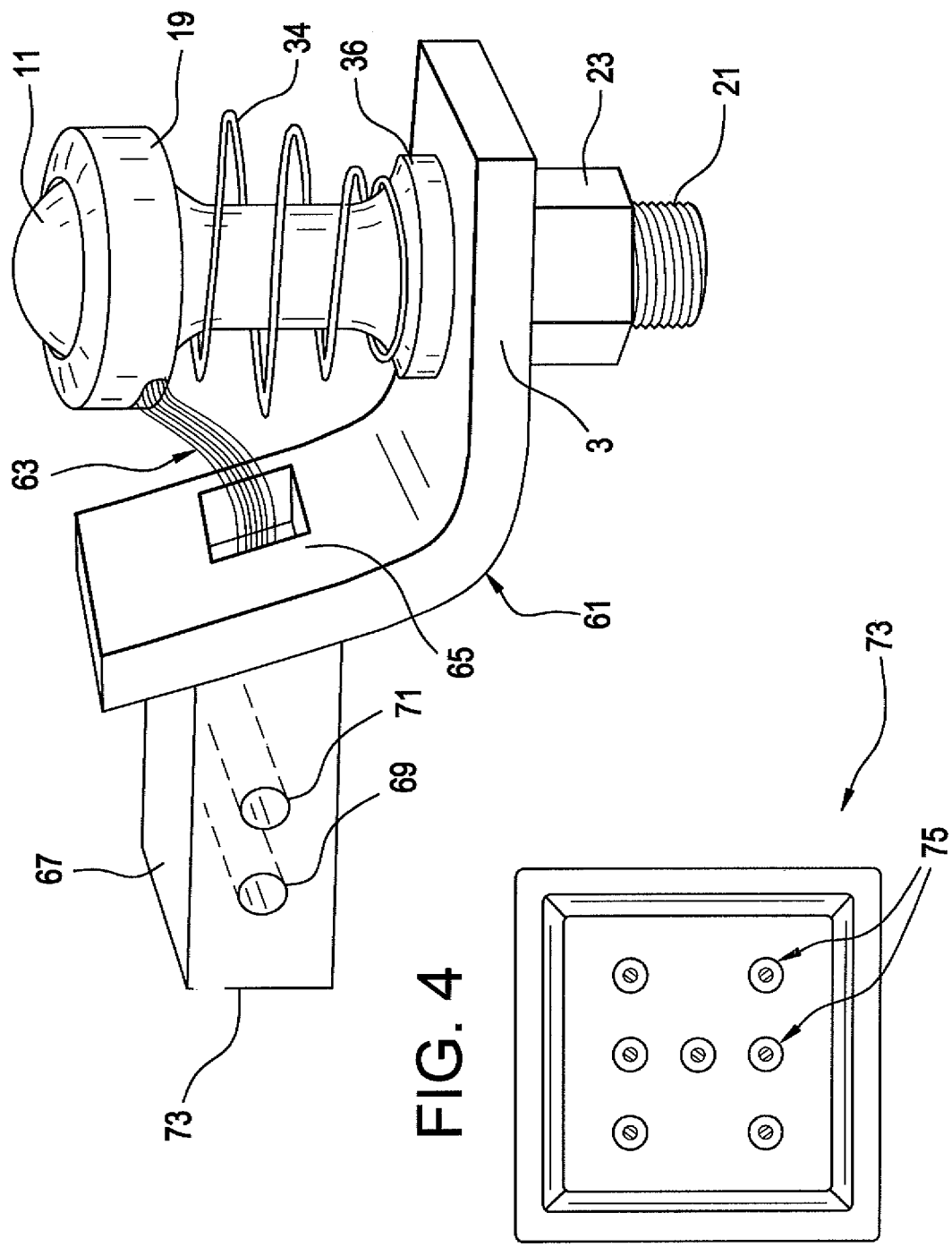

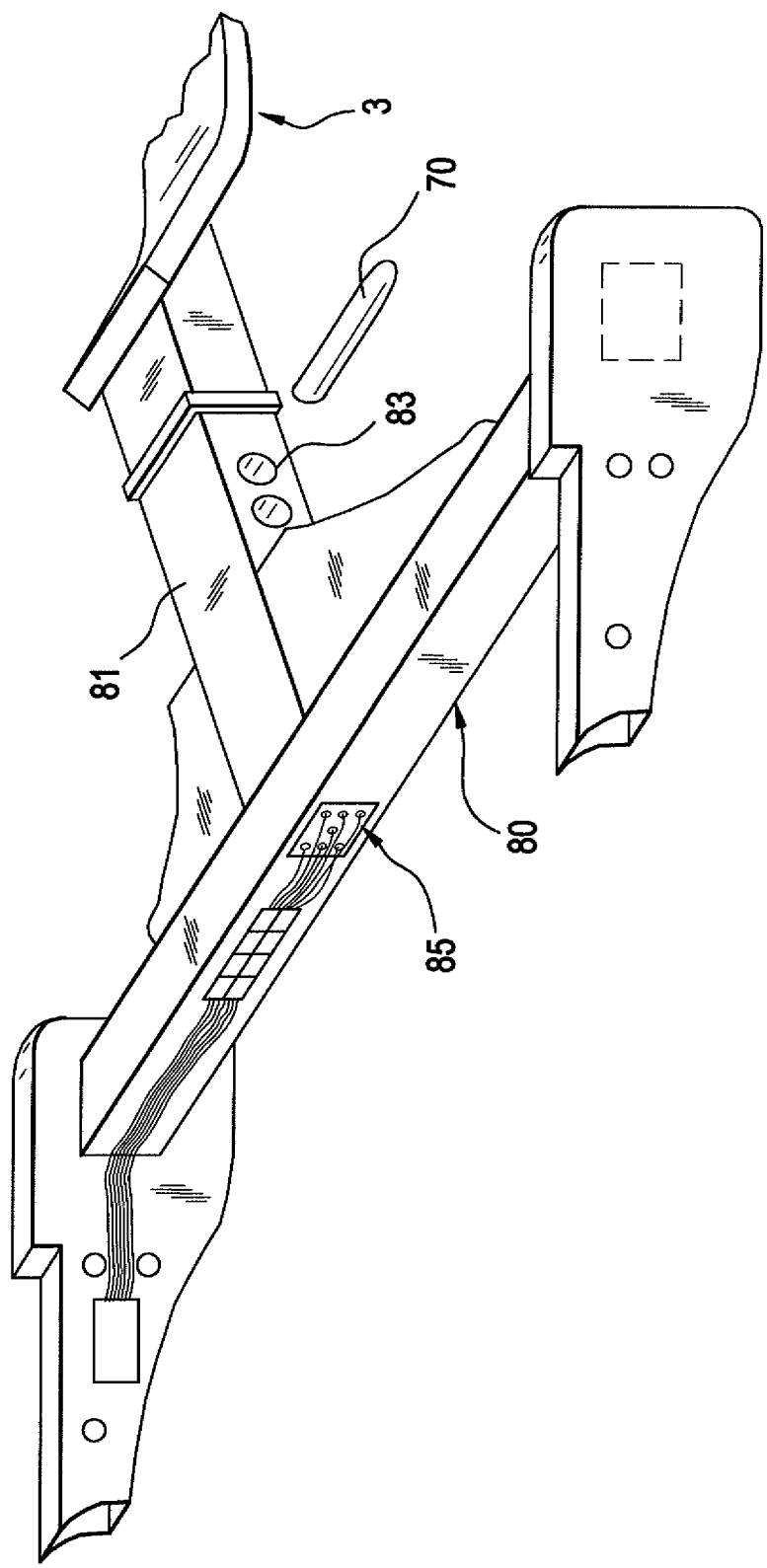

ELECTRICAL CONNECTION FOR TRAILER HITCH

BACKGROUND OF THE INVENTION

The present invention relates to an electrical connection for trailer hitch. Applicant is the inventor of the trailer hitch disclosed and claimed in U.S. Pat. No. 10,106,003 issued on Oct. 23, 2018. The patented trailer hitch provides a great advance in the field of hitching trailers to vehicles. Its main feature is electrical connections incorporated into a sleeve surrounding the hitch ball and the female coupling attached to the trailer or other towed vehicle.

FIG. 1 herein is the same as FIG. 1 from Applicant's prior patent and shows the hitch invention generally designated by the reference numeral 10, the ball 11, and the socket 13. The socket 13 depends downwardly and merges with a peripheral shoulder 15 that has at its underside a plurality of contact pins 33 which are shown in FIG. 2 herein which corresponds to FIG. 5 in the issued patent. The contacts 33 are biased downwardly by coil springs 18 (FIG. 2) which cause the contacts to be biased downwardly into contact with arcuate contacts 25, 27, 29 and 31 so that the pins 33 contact a respective contact in any rotative position of the socket 13 with respect to the collar 19 that carries the contacts 25, 27, 29 and 31.

As shown in FIG. 2, a coil spring 34 biases a plate 38 upwardly which causes the collar 19 to be biased upwardly to maintain contact between the pins 33 and the contacts on the collar 19. As shown in FIG. 1, an electrical conductor 57 includes from four to eight wires therein on the towing vehicle which connect to various ones of the arcuate contacts 25, 27, 29 and 31. An additional electrical conductor 59 connects to various features of the towed vehicle as understood by those skilled in the art.

What Applicant's prior patent fails to disclose is a manner by which the electrical conductor 57 may be interconnected into the existing wiring of the towed vehicle to make the electrical connection between the towing vehicle, the hitch 10, and the lights, brakes, reversing solenoid, and other features of the trailer or other towed vehicle. The present invention intends to further advance the details disclosed in Applicant's prior invention.

SUMMARY OF THE INVENTION

The present invention relates to an electrical connection for trailer hitch. The present invention includes the following interrelated objects, aspects and features:

(1) In a first aspect of the present invention, the hitching ball is attached to a hitch bar which includes, in most embodiments, a rectangular or square cross-section proximal end which is received within a corresponding rectangular or square cross-section receptacle located below the rear bumper of the towing vehicle. The receptacle is mounted on a draw bar of the towing vehicle.

(2) In the preferred embodiment, a passageway is formed through the hitch bar that allows the electrical conductor containing four to eight wires to be threaded through the hitch bar to its proximal end. At the proximal end the wires are attached to the first half of an electrical conductor.

(3) Within the rectangular cross-section receptacle, a second half of the connector is located which has complementary connections to interconnect with the connections on the first half of an electrical conductor located at the proximal end of the hitch bar. The mutually interconnectable connections can be pins and receptacles or recesses and the pins can be at the proximal end of the hitch bar or on the proximal side of the second connector half in the receptacle or vice-versa.

(4) The connector half within the rectangular cross-section receptacle may be spring biased in the distal direction in the preferred embodiment. The reason why this is the case is that many hitch bars have plural lateral holes to allow attachment within the receptacle at plural degrees of extension with respect to the rectangular cross-section receptacle. With the spring allowing the second half which can be a plate to reciprocate within the rectangular cross-section receptacle, the electrical connection can be made regardless of which lateral hole is chosen through which a pin can be extended to couple the hitch bar to the receptacle.

(5) As explained above, the half of the electrical connector within the rectangular cross-section receptacle is mounted on a plate which receives the distal end of the coil spring which also engages a proximal wall of the rectangular cross-section receptacle so that the spring can bias the plate in the distal direction.

(6) Electrical conductors are connected to the connector halves mounted on the plate and those wires extend proximally through the wall on which the coil spring is engaged and are coupled to electrical contacts on the proximal side of the draw bar which connect to the electrical coupling that is already in existence on the vehicle. In this way, the wires within the electrical conductor which is threaded through the hitch bar and coupled to a connector half at the proximal end of the hitch bar, are coupled electrically to the connector half attached to a plate and are now connected to all of the electrical connections already existing in the vehicle which allow the towed vehicle to respond to activations of brakes, turn signals, hazard warnings, headlights, and also engaging the transmission in reverse to activate a solenoid to release trailer brakes to allow a trailer to be moved in reverse.

(7) In this way, the invention disclosed in Applicant's prior U.S. patent can effectively be installed on towed and towing vehicles. All that need be done is to insert the rectangular cross-section proximal end of the hitch bar into the rectangular cross-section receptacle already on the vehicle and once that proximal end of the hitch bar is pushed therein, the connector halves engage one another and make the electrical connection between Applicant's patented trailer hitch, the towing vehicle, and the towed vehicle in an extremely efficient and easy manner. The present invention augments the advantageous features of Applicant's patented trailer hitch by providing an efficient manner of using that trailer hitch to couple the electrical connections between the towing vehicle and the towed vehicle so that a system is provided allowing all of that to be accomplished.

As such, it is a first object of the present invention to provide an electrical connection for trailer hitch.

It is a further object of the present invention to provide such a device in which the electrical conductor carrying multiple wires may be threaded through a passageway provided in the hitch bar and connect the electrical conductor to one half of an electrical coupling.

It is a further object of the present invention to provide such an invention in which the second half of the electrical connector is located within the rectangular cross-section receptacle on the vehicle to allow electrical connection to be made therebetween.

It is a still further object of the present invention to provide such an invention in which an electrical conductor connected to the second half of the electrical coupling is connected to wiring already present within the vehicle and located where the existing electrical connection is provided.

It is a still further object of the present invention to provide such an invention in which a hitch bar may merely be inserted into the rectangular cross-section receptacle to make the electrical connection and the inventive trailer hitch may be utilized to efficiently couple a towing vehicle to a towed vehicle.

These and other objects, aspects and features of the present invention will be better understood from the following detailed description of the preferred embodiment when read in conjunction with the appended drawing figures.

BRIEF DESCRIPTION OF THE DRAWINGS

FIG. 3 shows a perspective view of a hitch bar showing certain details of the present invention.

FIG. 4 shows a view looking distally from the proximal end of the hitch bar.

FIG. 5 shows a perspective view of the rear portion of the towing vehicle.

SPECIFIC DESCRIPTION OF THE PREFERRED EMBODIMENT

Figure 1:
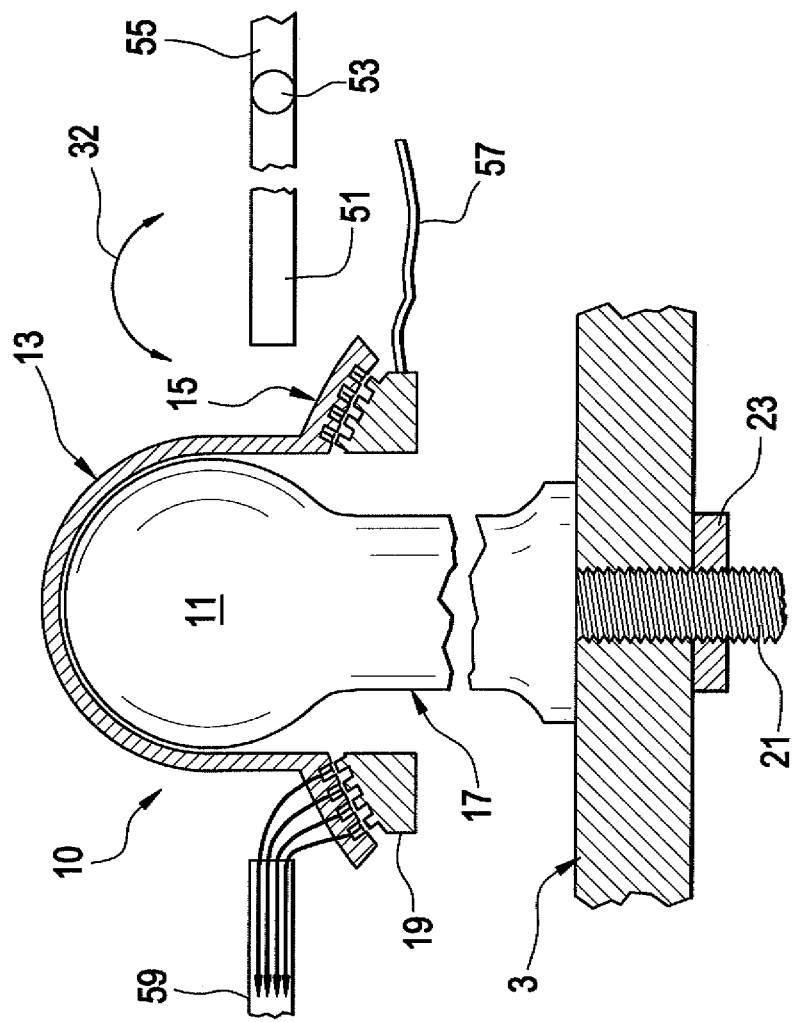
FIG. 1 shows a side view partially in cross-section of the invention disclosed in U.S. Pat. No. 10,106,003 and corresponds to FIG. 1 in that patent.
Figure 2:
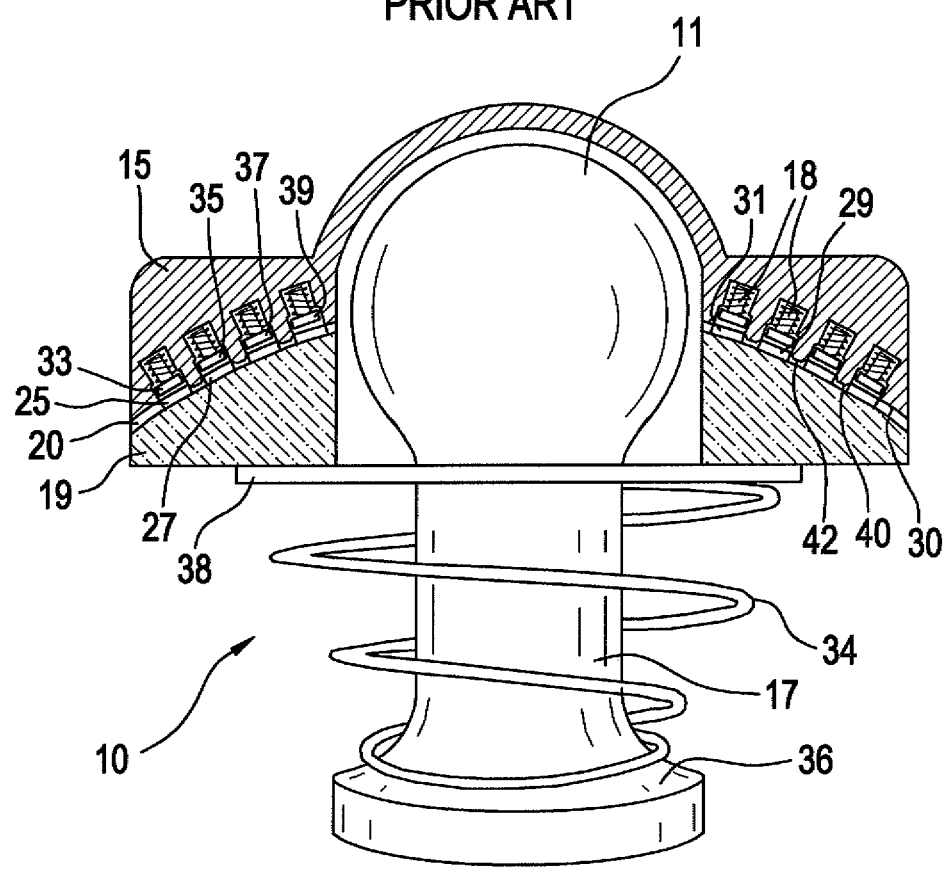
FIG. 2 shows a side view partially in cross-section including other aspects of the invention disclosed in U.S. Pat. No. 10,106,003 and corresponds to FIG. 5 in that issued patent.

With reference first to FIG. 3, reference numerals corresponding to those set forth in Applicant's prior patent are the same as shown in FIGS. 1 and 2 herein. As seen in FIG. 3, the hitch bar 3 has an arcuate portion 61 which includes an opening (not shown) which receives the threaded stem 21 which is fastened to the hitch bar by a threaded fastener 23. The spring 34 biases the collar 19 upwardly. An electrical conductor 63 is attached to the collar 19 which has mounted thereon a plurality of arcuate contacts as shown in FIG. 3 of Applicant's issued patent. The electrical conductor 63 includes from four to eight wires. Those wires couple the towed vehicle such as a trailer to various electrical features on the towing vehicle. Those features can include the headlights, brake lights, running lights, signals, hazard flashers, turn signal controls, and the transmission so that when the towing vehicle is shifted into reverse, a solenoid in the towed vehicle such as a trailer can release the trailer brakes to allow the trailer to be backed up in the reverse direction.

As seen in FIG. 3, the arcuate portion 61 has a hole 65 therethrough through which the electrical conductor 63 extends as will be described in greater detail hereinafter. Also seen in FIG. 3 is a rectangular cross-section proximal end or coupling half 67 of the hitch bar 3 which includes a plurality of lateral holes 69 and 71 each of which allows insertion of a pin 70 (FIG. 5) to couple the portion 67 to a rectangular cross-section receptacle as will be described in greater detail hereinafter. The passageway 79 (FIG. 7) through the proximal portion 67 does not intersect the lateral holes 69 and 71 and carries the electrical conductor 63 to the proximal end 73 of the hitch bar 3.

FIG. 4 shows the proximal end 73 of the portion 67 of the hitch bar 3. As shown, a plurality of contacts 75 are displayed. These contacts comprise one half of an electrical connector also described as a first electrical connector half and may comprise recesses or pins as will be described hereinafter with regard to FIGS. 8-10. These contacts 75 correspond in number to the number of wires contained within the electrical conductor 63.

With reference now to FIG. 5, a tow bar 80 is seen to have connected thereto a rectangular cross-section receptacle 81. That receptacle includes a lateral hole 83 that can be aligned with either of the lateral holes 69 or 71 so that the pin 70 can be inserted through the hole 83, the hole 69 or 71, and a hole on the other side of the receptacle 81 (not shown) to couple the hitch bar 3 to the receptacle 81. As shown in FIG. 5, a connector 85 is provided on the proximal end of the tow bar and connects with an electrical connector on the distal side of the tow bar 80 which is found on the tow vehicle and which is typically (in the prior art) used to couple electrical connections from the towed vehicle. The connector 85 connects to all of the electrical features described above that will need to be transferred to the towed vehicle.

Figure 6:
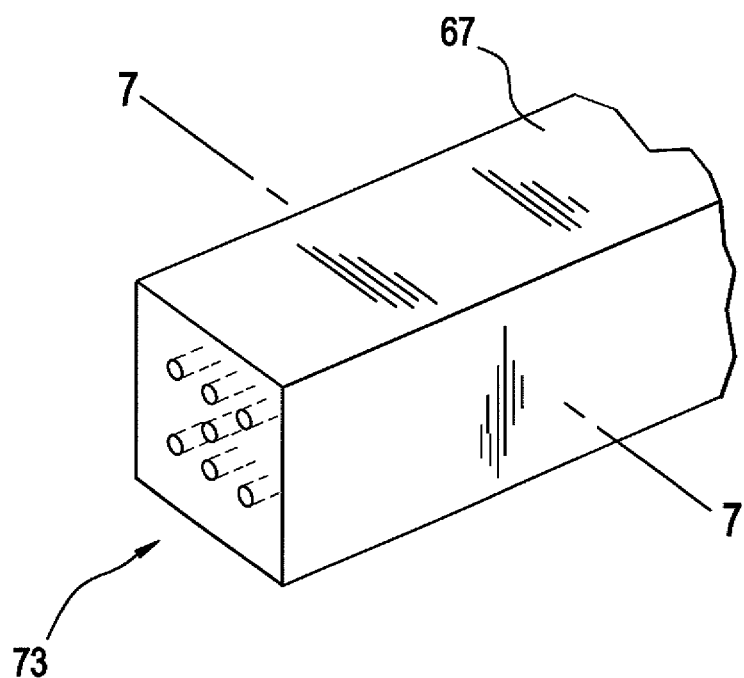
FIG. 6 shows a perspective view showing the distal end of the hitch bar.
Figure 7:
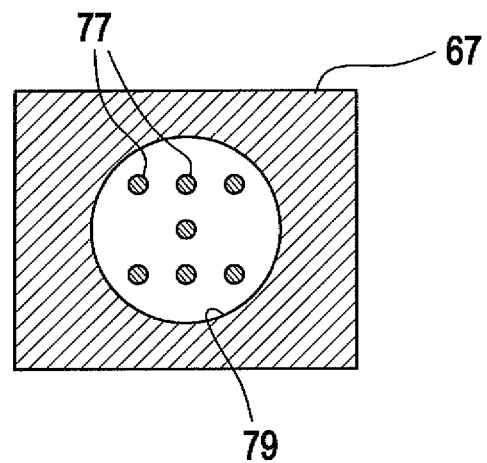
FIG. 7 shows a cross-sectional view along the line 7-7 of FIG. 6.

With reference to FIGS. 6 and 7, the connector 73 is shown on the proximal end of the portion 67 of the hitch bar 3. FIG. 7 shows the wires 77 extending through the passageway 79 through the portion 67.

Figure 8:
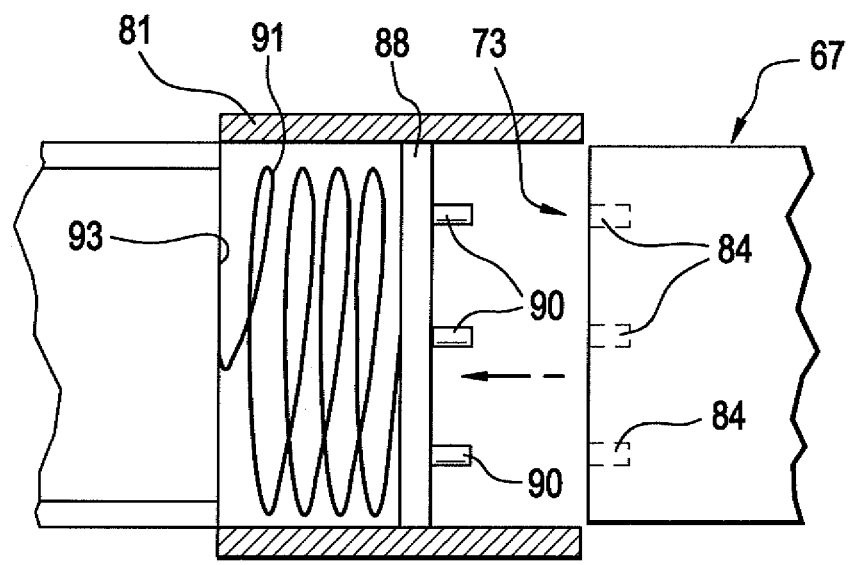
FIG. 8 shows a side view of the electrical connector between the hitch bar and a plate within the rectangular cross-section receptacle.
Figure 9:
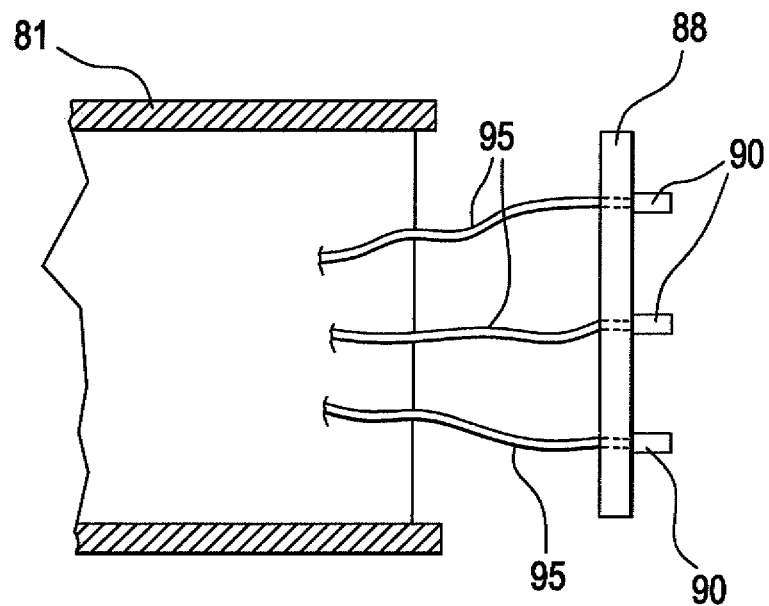
FIG. 9 shows a view similar to that of FIG. 9 with certain features removed to show detail.

With reference to FIGS. 8 and 9, the proximal portion 67 is shown with the coupling 73 provided with electrical contact recesses 84. A plate 88 within the rectangular cross-section receptacle 81 defines a second electrical connector half having pins 90 which are inserted within the recesses 84 to make the electrical connection. A coil spring 91 engages the proximal end of the plate 88 and a wall 93 to bias the plate 88 in the direction of the portion 67 of the hitch bar 3. The floating nature of the plate 88 permits the electrical connection between the recesses 84 and the pins 90 to be made regardless of which lateral passageway 69 or 71 in the proximal portion 67 is used to couple the hitch bar 3 to the receptacle 81.

FIG. 9 shows the plate 88 with its pins 90 and electrical conductors 95 connected to each pin 90.

Figure 10:
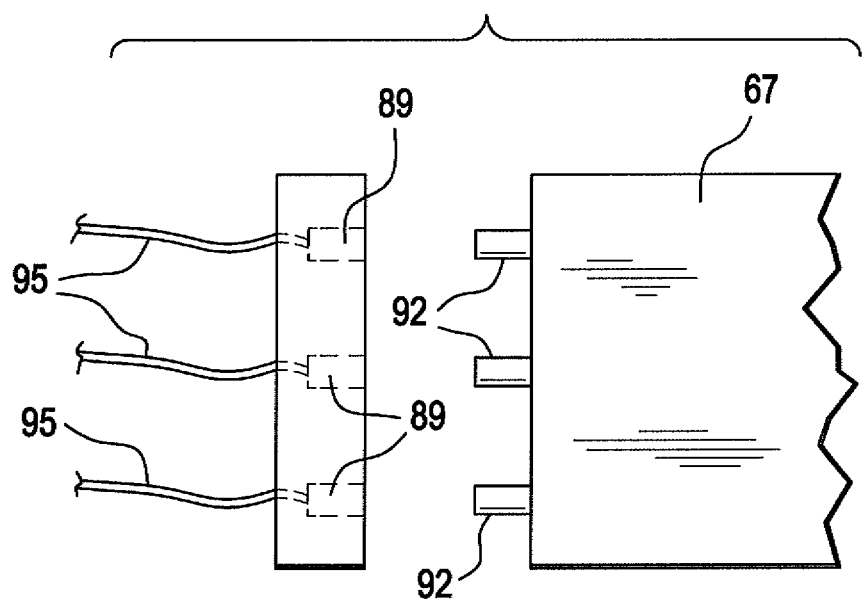
FIG. 10 shows a view similar to that of FIG. 10 with connector half pins and recesses being reversed.

With reference to FIG. 10, an alternative embodiment is shown in which the recesses 84 are replaced with pins 92 and the pins 90 are replaced with recesses 89 which is the reverse of the situation shown in FIGS. 8 and 9. However, the functions are the same.

Figure 11:
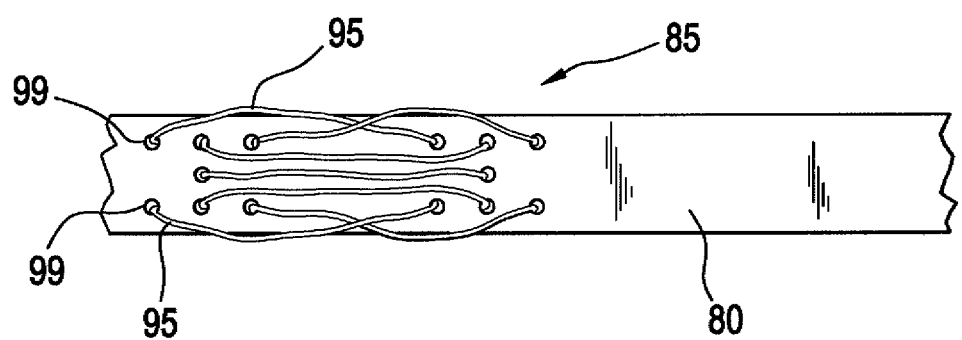
FIG. 11 shows a view looking distally from the proximal surface of the tow bar of the towing vehicle showing connection of electrical conductors between the hitch bar and the existing connectors on the tow bar.

FIG. 11 shows the tow bar 80 and the connections at 85 which connect to an existing electrical socket on the towing vehicle. It also shows holes 99 through which the wires 95 extend and couple to the connector 85 to couple the electrical conductor 63 to the existing electrical wiring of the towing vehicle. The connector 85 which connects with the coupling at the rear of the tow bar 80 which is found on most towing vehicles connects all of the electrical systems of the vehicle which are going to be utilized by the towed vehicle to the electrical circuitry of the towing vehicle so that when the portion 67 of the hitch bar 3 is inserted into the receptacle 81 and the connector halves shown in particular in FIG. 8 or FIG. 10 with the interconnecting pins and recesses connect the electrical circuitry together.

The electrical connections between the towing vehicle and the towed vehicle such as a trailer may include electrical conductors conveying data received from sensors on the towed vehicle. For example, sensors can monitor (1) operation of various lights on the towed vehicle and report malfunctions, (2) whether safety chains are loose, (3) whether emergency brake wire is disconnected, (4) tire pressures, (5) stuck brakes, (6) operation of solenoid brake release, and others. This ability enhances safety.

In this way, the present invention provides a simple way to couple a towing vehicle to a towed vehicle with all the electrical connections being made with the hitch bar 3 proximal portion 67 received within the receptacle 81. Once the hitch bar 3 is connected to the receptacle 81, as soon as the socket 13 on the towed vehicle is coupled over the ball 11, all electrical connections are now made with no need to separately connect an electrical conductor to a receptacle on the vehicle. In this way, there is no wire dangling between the towing vehicle and the towed vehicle which can get damaged or torn or be dislodged. The connections are secure and effective.

Thus, with the present invention in place, Applicant's invention that is the subject of his prior patent may now be incorporated into a trailer hitching system of great efficiency and effectiveness.

As such, an invention has been disclosed in terms of a preferred embodiment thereof which fulfills each and every one of the objects of the invention as set forth hereinabove, and provides a new and useful electrical connection for trailer hitch of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. In a trailer hitching system comprising a hitch bar carrying a hitching ball connected to a neck, a collar below said hitching ball surrounding said neck and reciprocable on said neck, said collar having a plurality of electrical conductors, a plurality of electrical contacts on said collar, each electrical contact having one of said electrical conductors connected thereto, said hitch bar including a proximal coupling half receivable within a recess in a coupling receptacle on a towing vehicle to couple said hitch bar to said towing vehicle, a socket on a towed vehicle sized to couple with said hitching ball and including electrical circuitry connectable to said electrical contacts on said collar to electrically connect electrical systems on said towed vehicle to said electrical contacts on said collar, the improvement comprising a passageway extending through said proximal coupling half, said electrical conductors for said electrical contacts on said collar extending through said passageway to a proximal end of said proximal coupling half, a first electrical connector half located on said proximal end of said proximal coupling half, each of said electrical conductors being connected to an electrical contact on said first electrical connector half, and a second electrical connector half located in said coupling receptacle, said second electrical connector half having electrical contacts thereon complementary to said contacts on said first electrical connector half and aligned therewith, whereby said electrical connector halves engage one another to electrically connect said electrical contacts on said collar with said electrical contacts on said second electrical connector half, said electrical contacts on said second electrical connector half being electrically connected to electrical circuitry on said towing vehicle.

2. The improvement of claim 1, wherein said proximal coupling half has a rectangular cross-section.

3. The improvement of claim 2, wherein said coupling receptacle recess has a rectangular cross-section complementary with said rectangular cross-section of said proximal coupling half.

4. The improvement of claim 1, wherein said coupling receptacle and proximal coupling half have lateral holes alignable to facilitate inserting a pin therethrough to couple said coupling receptacle to said proximal coupling half.

5. The improvement of claim 1, wherein said towing vehicle has an existing electrical socket with existing wires connected thereto and to electrical systems of said towing vehicle.

6. The improvement of claim 5, wherein said electrical circuitry on said towing vehicle includes said existing wires.

7. The improvement of claim 6, wherein said electrical contacts on said second electrical connector half are electronically connected to said existing wires via said existing electrical socket.

8. The improvement of claim 1, wherein said second electrical connector half comprises a plate located within said coupling receptacle.

9. The improvement of claim 8, wherein said plate is reciprocable within said coupling receptacle.

10. The improvement of claim 9, wherein said plate is spring biased in a distal direction.

11. The improvement of claim 10, wherein said electrical contacts on said first electrical connector half comprise pins.

12. The improvement of claim 11, wherein said electrical contacts on said second electrical connector half comprise recesses.

13. The improvement of claim 10, wherein said electrical contacts on said first electrical connector half comprise recesses.

14. The improvement of claim 13, wherein said electrical contacts on said second electrical connector half comprise pins.

15. The improvement of claim 1, wherein said electrical systems on said towed vehicle include lights and brakes, and said towed vehicle further includes sensors for monitoring operation of said electrical systems, information from said sensors being conveyed to said towing vehicle via said electrical conductors.

16. In a trailer hitching system comprising a hitch bar carrying a hitching ball connected to a neck, a collar below said hitching ball surrounding said neck and reciprocable on said neck, said collar having a plurality of electrical conductors, a plurality of electrical contacts on said collar, each electrical contact having one of said electrical conductors connected thereto, said hitch bar including a proximal coupling half with a rectangular cross-section receivable within a rectangular cross-section recess in a coupling receptacle on a towing vehicle to couple said hitch bar to said towing vehicle, a socket on a towed vehicle sized to couple with said hitching ball and including electrical circuitry connectable to said electrical contacts on said collar to electrically connect electrical systems on said towed vehicle to said electrical contacts on said collar, the improvement comprising a passageway extending through said proximal coupling half, said electrical conductors for said electrical contacts on said collar extending through said passageway to a proximal end of said proximal coupling half, a first electrical connector half located on said proximal end of said proximal coupling half, each of said electrical conductors being connected to an electrical contact on said first electrical connector half, and a second electrical connector half located in said coupling receptacle, said second electrical connector half having electrical contacts thereon complementary to said contacts on said first electrical connector half and aligned therewith, whereby said electrical connector halves engage one another to electrically connect said electrical contacts on said collar with said electrical contacts on said second electrical connector half, said electrical contacts on said second electrical connector half being electrically connected to electrical circuitry on said towing vehicle, said coupling receptacle and proximal coupling half having lateral holes alignable to facilitate inserting a pin therethrough to couple said coupling receptacle to said proximal coupling half.

17. The improvement of claim 16, wherein said second electrical connector half comprises a plate located within said coupling receptacle, said plate being reciprocable within said coupling receptacle.

18. The improvement of claim 17, wherein said plate is spring biased in a distal direction.

19. The improvement of claim 18, wherein said electrical contacts on said first electrical connector half comprise pins.

20. The improvement of claim 19, wherein said electrical contacts on said second electrical connector half comprise recesses.

\* \* \* \* \*